United States Patent [19]

Leistner et al.

[11] Patent Number: 4,499,787

[45] Date of Patent: Feb. 19, 1985

[54] ROTARY DRIVE TRANSMISSION MECHANISM ESPECIALLY FOR MOTOR VEHICLES

[75] Inventors: Rolf Leistner, Munich; Herbert Becker, Coburg, both of Fed. Rep. of Germany

[73] Assignee: Brose Fahrzeugteile GmbH und Co., Munich, Fed. Rep. of Germany

[21] Appl. No.: 373,271

[22] Filed: Apr. 29, 1982

[30] Foreign Application Priority Data

May 11, 1981 [DE] Fed. Rep. of Germany ....... 3118634

[51] Int. Cl.³ ...................... F16H 35/00; E05F 15/00; F16D 21/02

[52] U.S. Cl. ........................................ 74/625; 49/139; 192/48.91; 192/76; 192/95

[58] Field of Search ......................... 74/625, 661, 670; 192/37, 74, 76, 48.5, 48.6, 48.91, 95, 54, 17 D; 464/73; 49/139, 140, 349, 352

[56] References Cited

U.S. PATENT DOCUMENTS

| | | | |
|---|---|---|---|
| 1,973,671 | 9/1934 | Stevenson | 192/74 |
| 1,997,646 | 4/1935 | Miller | 49/352 X |
| 2,185,731 | 1/1940 | Hubbell | 192/54 X |
| 2,577,181 | 12/1951 | Christensen | 192/17 D |
| 2,620,640 | 12/1952 | Bales | 464/73 |
| 2,771,789 | 11/1956 | Rossmann et al. | 74/625 |
| 3,008,558 | 11/1961 | Bennett et al. | 192/48.91 X |
| 3,618,730 | 11/1971 | Mould | 192/74 X |
| 3,930,422 | 1/1976 | Morimatsu | 74/625 |
| 3,930,566 | 1/1976 | Matsushima | 192/8 C |
| 4,034,575 | 7/1977 | Barth | 464/73 |
| 4,194,605 | 3/1980 | Sessa | 49/352 X |
| 4,216,624 | 8/1980 | Blankenburg et al. | 49/352 |
| 4,367,660 | 1/1983 | Becker et al. | 74/625 |
| 4,421,299 | 12/1983 | Hess | 49/352 X |

FOREIGN PATENT DOCUMENTS

| | | | |
|---|---|---|---|
| 492284 | 4/1953 | Canada | 49/140 |
| 487155 | 12/1929 | Fed. Rep. of Germany . | |
| 2524583 | 5/1977 | Fed. Rep. of Germany . | |
| 2705627 | 8/1978 | Fed. Rep. of Germany . | |
| 2915669 | 10/1980 | Fed. Rep. of Germany . | |
| 1493089 | 7/1967 | France . | |
| 2378164 | 8/1978 | France . | |

*Primary Examiner*—Rodney H. Bonck

*Attorney, Agent, or Firm*—Toren, McGeady and Stanger

[57] ABSTRACT

An adjustment drive apparatus particularly for motor vehicles having coaxial rotatably supported driving and driven members with a helical spring which is braced against the inner circumferential surface of a hollow cylindrical element coaxial with these members operating to effect drive transmission therebetween. One of the members has a first claw or driver connection member rigidly affixed thereto, the claw member pressing against one of the ends of the helical spring to effect an extension or enlargement of the spring when relative rotation occurs between the spring and the claw member. The hollow cylindrical element within which the helical spring is located is affixed for rotation with the other of the driving and driven members. An auxiliary driving member is provided which, when activated, will cause the spring to be disengaged so that the driven member may be rotated through the auxiliary driving member.

14 Claims, 3 Drawing Figures

ROTARY DRIVE TRANSMISSION MECHANISM ESPECIALLY FOR MOTOR VEHICLES

The present invention relates generally to a drive apparatus and more particularly to an adjustment drive mechanism for motor vehicles. More specifically, the invention relates to a device of the type wherein rotatably supported driving and driven members are provided with spring means being arranged therebetween to effect frictional driving engagement of the members.

Drive apparatus of the type to which the present invention relates are known, for example, from German Offenlengungsschrift No. 25 24 583 and German Pat. No. 487 155. In the devices disclosed in these references, a hollow cylindrical element is arranged as a stationary part of a drive housing and serves in connection with a helical spring and with claw members fitted on both members as a helical spring brake for a window lift mechanism of a motor vehicle. The two members of these devices are coupled by means of mutually interengaging claw members.

The present invention is directed toward provision of a drive mechanism of the type mentioned above wherein the driving member and the driven member may be connected together for drive transmission by means of a coupling which is easily disengaged and which is of an especially simple construction.

SUMMARY OF THE INVENTION

Briefly, the present invention may be described as a drive transmission mechanism especially suited for motor vehicles comprising a rotatably supported driving member, a rotatably supported driven member coaxial with said driving member, a hollow cylindrical element defining an inner circumferential surface arranged coaxially with said driving and driven members, a helical spring braced against the inner circumferential surface of said hollow cylindrical member, and a first claw member affixed on one of said driving and said driven members for rotation therewith, said claw member operating to engage with the helical spring to effect expansion of the spring when the first claw member and the spring are rotated relative to each other, said hollow cylindrical member defining said inner circumferential surface being rotatably affixed with the other of said driving and said driven members.

Thus, in the operation of the present invention, the helical spring is contained within a cylindrical element which is rotatably affixed with one of the driving or driven members and, as a result of frictional engagement of the spring with the inner circumferential surface of the cylindrical member, the spring is rotated when the hollow cylindrical element is rotated whereby an end of the spring is brought into engagement with the first claw member. This results in expansion of the spring thereby tightening the frictional engagement between the driving and driven members.

The present invention is also adaptable to be driven by an auxiliary driving member which may be manually operated. When the auxiliary driving member is actuated, it operates to engage the helical spring to effect contraction of the spring whereby the spring is taken out of engagement between the driving and driven members with the driven member being thereafter driven directly through the auxiliary driving member.

Thus, an important aspect of the structural arrangement of the present invention involves the fact that the hollow cylindrical element within which the helical spring is arranged is rotatably fixed with one of the driving or driven members. If the two members are rotated against each other in such a manner that the first claw member presses against the helical spring in order to effect expansion thereof, this causes the helical spring to be pressed against the inner cylindrical surface with a radial force which increases with the torque which is being transmitted between the driving and driven members. As a result, there is obtained a reliable rotational coupling of the members when there occurs a mutual rotation in the sense indicated. It makes no difference in the concept of the present invention whether the hollow cylindrical element is rigidly connected for rotation with the driving member or with the driven member. The rotational coupling between both members may be disconnected by moving the helical spring in a direction away from its frictionally engaging pressure position on the inner circumferential surface of the hollow cylindrical element. This may be achieved, for example, by applying pressure on one of the ends of the helical spring to effect loosening of the diameter of the helical spring, that is, by pulling the helical spring in a circumferential direction at one end. If this is accomplished with the aid of the first claw member, which then presses on the one end of the helical spring in one rotational direction to effect enlargement and in the other rotational direction to effect reduction of the diameter of the helical spring, the result will be a freewheeling system which is extremely simple in construction. In this case, the other end of the helical spring is then not bent.

In a preferred embodiment of the present invention there is provided an isolated, rotatably supported disengaging element which is coaxial with the driving and driven members, with the disengaging element being constructed to include a second claw member which, when there is a corresponding mutual rotation of the helical spring and of the second claw member, will press on one of the ends of the helical spring to effect reduction of the diameter of the spring. In this arrangement, the rotational coupling betwween the driving and driven members is, if necessary, also operative in both rotational directions and it may be detached in a simple manner by a corresponding actuation of the disengaging element.

In another preferred embodiment of the invention, the driving member, which may preferably be driven by an electrical motor, is rigidly connected for rotation with the hollow cylindrical element and the first claw member which is connected rigidly for rotation with the driven member presses on one or the other ends of the helical spring depending upon the rotational position, to the effect that expansion of the helical spring occurs. In this embodiment, the second claw member, depending upon the rotational position, presses against one or the other end of the helical spring in order to effect a reduction in the diameter of the helical spring. The disengaging element may be connected to an auxiliary drive source, which may preferably be a manual source, thereby providing a device which may be manually driven when necessary.

As a result of the arrangement of the present invention, a compact, constantly effective auxiliary actuating member may be obtained. When there is failure of the drive motor which drives the driving member, the driven member may readily be rotated in either one of two rotational directions by a corresponding rotation of the disengaging element or auxiliary driving element, with the rotational coupling between the driving member and the driven member which is normally effected by the helical spring being thereby disconnected.

In this regard, the driving member if necessary may be blocked or locked by virtue of the fact that the electrical motor is not stationary. The action whereby the driven member is driven by the disengaging element or auxiliary driving member occurs by means which include operation wherein the second claw member presses an end of the helical spring against the first claw member and by so doing carries the latter therewith. After elimination of the defect in the driving system, the drive apparatus in accordance with the present invention may be readily restored to normal operation merely by disengaging the power supply to the auxiliary driving member, for example, merely by removing a crank handle from the driving member.

The entire arrangement in accordance with the present invention will therefore be found to be very compact due to the fact that the disengaging or auxiliary driving element is supported coaxially relative to the driven and driving members.

The various features of novelty which characterize the invention are pointed out with particularity in the claims annexed to and forming a part of this disclosure. For a better understanding of the invention, it operating advantages and specific objects attained by its use, reference should be had to the accompanying drawings and descriptive matter in which there is illustrated and described a preferred embodiment of the invention.

DETAILED DESCRIPTION OF THE PREFERRED EMBODIMENTS

Figure 1:
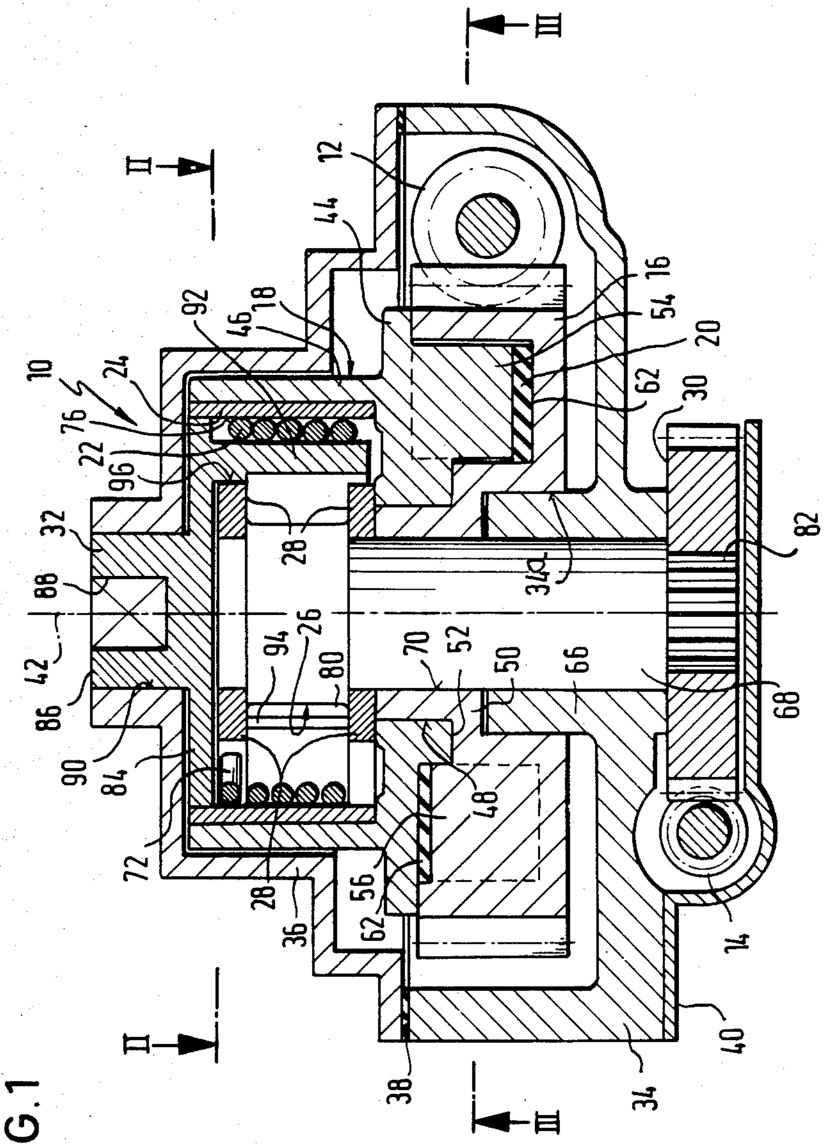
FIG. 1 is a sectional view showing a drive apparatus in accordance with the present invention, the view of FIG. 1 being taken along the line I—I shown in FIGS. 2 and 3.

The drive transmission apparatus in accordance with the present invention as shown in the drawings is generally identified with reference numeral 10. The mechanism is basically operative to establish a driving connection between an electrical drive motor (not shown) and, for example, a threaded cable of a window lifting mechanism for a motor vehicle. The shaft of the electric drive motor may, for example, have connected thereto a worm 12 which, as shown in FIG. 1, operates as the driving or power input member of the mechanism. The drive transmission mechanism of the invention may operate to drive a threaded cable 14 which is depicted at the bottom left in FIG. 1 and which may operate to actuate the window mechanism of an automotive vehicle.

Thus, it will be seen that with the invention, power input occurs through the worm 12 and power output occurs at the threaded cable 14, with the mechanism of the invention operating to transmit power between these elements.

The worm 12 is connected with a driving member 16 which constitutes a worm wheel or worm gear and which meshes with the worm 12. Rotatively affixed with the driving member 16 is a hollow cylindrical element 18 which is coupled with the driving member 16 by means of a rubber cushioning member 20. The rubber cushioning member 20 operates to absorb the torsional vibrations between the driving member 16 and the hollow cylindrical element 18 when both are driven in unison by the worm 12.

The mechanism also includes a helical spring 22 which is braced against the inner circumference of an insert sleeve 24 which is inserted into the hollow cylindrical element 18.

The mechanism also contains a driven member 26 which, as will be explained in more detail hereinafter, is rotatively driven by the transmission mechanism of the invention through the frictional engagement of the helical spring 22 against the inner surface of the insert 24.

The driven member 26 has formed at its upper end, as seen in FIG. 1, a pair of driven discs 28 which are formed with a first claw member and which interact with the helical spring 22.

On the lower end of the driven member 26 there is provided a pinion 30 which engages into the threaded cable 14 and is rotatively driven through the transmission mechanism of the invention.

The transmission mechanism includes a further rotating member which comprises a disengaging or auxiliary driving element 32 which, as shown in FIG. 1, is arranged above the driven member 26. The auxiliary driving or disengaging element 32 is arranged so that it is not engaged within the power path between the driving member 16 and the driven member 26 and when the driven member 26 is driven through the driving member 16, the auxiliary driving element 32 merely rotates freely without interfering with normal operation. However, as will be described in more detail hereinafter, the auxiliary driving element 32 will operate in case of malfunctioning of the power drive mechanism, for example when defective drive motor operation occurs, to make possible manual actuation of the window lift mechanism. Thus, the auxiliary driving element 32 may operate as an alternative or auxiliary driving device whereby the driven member 26 may be driven through the auxiliary driving element 32 when power from the driving member 16 is no longer available.

As will be seen from FIG. 1, the rotating members 16 and 32 are supported in a bipartite housing having a lower housing member 34, a housing cover 36, and an intermediate sealing ring 38 interposed between the housing base member 34 and the cover 36. An outer housing frame member 40 mounted on the underside of the base member 34 operates also as a guide for the threaded cable 14 and to protect the cable 14 and the pinion 30 from becoming damaged. The housing of the unit may be manufactured from plastic material or from metal.

Figure 3:
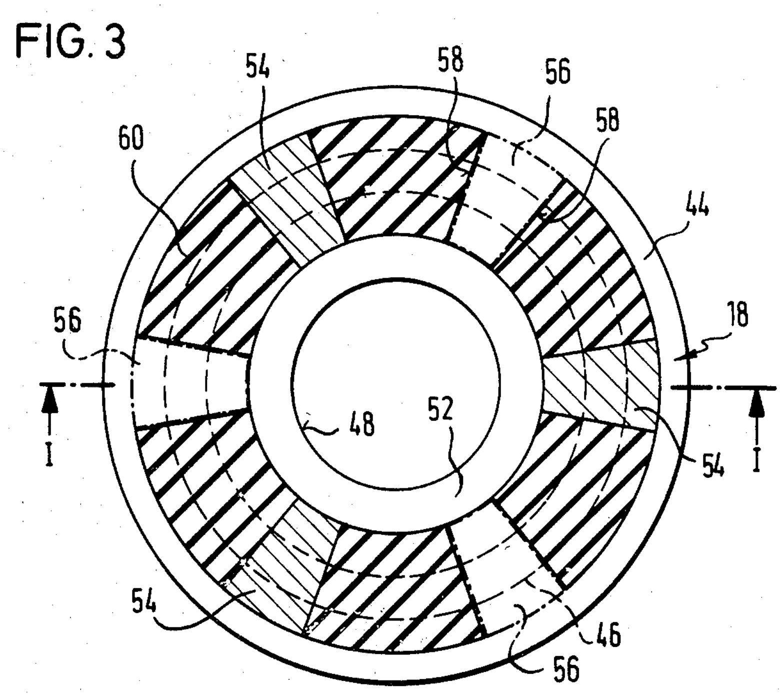
FIG. 3 is a cross-sectional view of a component part of the mechanism shown in FIG. 1, the section being taken along the line III—III.

The connection between the driving member 16 and the hollow cylindrical element 18 whereby they are rotatably affixed together and whereby vibrations will be absorbed is best illustrated in FIG. 3. The sectional view of FIG. 3 shows the hollow cylindrical element 18 and the rubber cushioning member 20 in sectional view. Although the driving member 16 is not physically depicted, there are shown spaces wherein webs 56 of the driving member 16 may extend, as will be explained more fully hereinafter. It will be seen that the hollow cylindrical element 18 is constructed to include a bearing disc 44 which is located to extend perpendicularly to the rotational axis 42 shown in FIG. 1. The disc 44 connects with a hollow cylindrical section 46 shown in dotted line in FIG. 3 and best seen in FIG. 1 within which the insert sleeve 24 is inserted. The bearing disc 44 is constructed with a central bearing aperture 48 whereby the hollow cylindrical element 18 is supported on a correspondingly dimensioned bearing collar 50 of the driving element 16 so that the hollow cylindrical element 18 may rotate together with the driving element 16. In order to increase the rotational support area in the axial direction and to consequently increase stability against relative rotation or over running, a bearing neck or axle journal 52 is also formed on the bearing disc 44 so as to project downwardly and engage with the bearing collar 50, as will be seen from both FIGS. 1 and 3.

The hollow cylindrical element 18 is formed to include three circumferentially distributed webs 54 extending downwardly from the bearing disc 44 and radially outwardly from the bearing neck 52 with each of the webs 54 terminating radially inwardly from the outer circumference of the bearing disc 44. The downwardly projecting orientation of the webs 54 is best seen in FIG. 1.

The driving member 16 is similarly formed with three webs 56 having lateral surfaces 58 which extend parallel to the rotational axis 42 of the transmission mechanism, the surfaces 58 being shown in dot-dash line in FIG. 3.

The webs 56 are circumferentially arranged so that each web is angularly located between two of the webs 54 with an intermediate space remaining between each of the adjacent webs 54, 56 in the circumferential direction. Each of these intermediate spaces between the webs 54, 56 is filled with a suitably formed segment 60 which is part of the rubber cushioning member 20. As best seen in FIG. 3, the segments 60 are arranged to be circumferentially dispersed around the transmission mechanism and they are connected with each other by a correspondingly thinner connecting section 62 best seen in FIG. 1. Thus, the rubber cushioning member 20 is formed as a single unitary piece and it consequently can be economically produced and mounted. The hollow cylindrical element 18 is thereby mounted on the driving member 16 by means of the bearing collar 50 and the bearing neck 52 so as to be rotatable therewith. At the same time, however, a slight spring cushioning and vibration-absorbing characteristic is developed by means of the segment 60 in both rotational directions of the mechanism.

The driving member 16 is, in turn, rotatably supported on a bearing neck 66 of the housing base member 34 which reaches into a corresponding bearing opening **34*a* formed in the driving member 16. Furthermore, the driving member 16 is also rotatably supported on a cylindrical driven shaft 68 of the driven member 26, the driven shaft 68 extending through a bearing aperture 70 formed in the bearing collar 50 of the driving member 16**.

Figure 2:
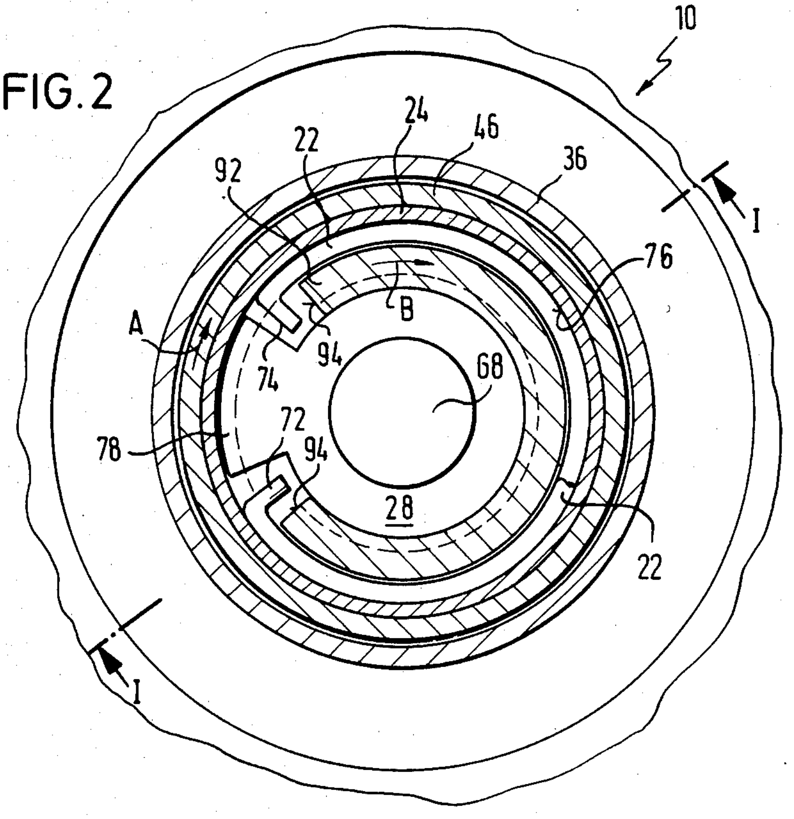
FIG. 2 is a cross-sectional view of the mechanism shown in FIG. 1 taken along the line II—II.

The helical spring 22 which is inserted into the insert sleeve 24 is formed so as to be wound in the manner of a cylindrical coil with both ends of the coil being bent radially inwardly. As best seen in FIG. 1, the helical spring 22 is formed with an upper end 72 and a lower end 74, each of which extend radially inwardly from the insert sleeve 24. The helical spring 22 is shaped so that its outer diameter will be somewhat greater than the inner diameter of the insert sleeve 24. Thus, when the spring 22 is placed within the insert sleeve 24, there will occur a residual frictional engagement between the spring 22 and the inner surface of the sleeve 24 whereby the spring 22 will be pressed radially outwardly against a circumferential surface 76 of the sleeve 24. The ends 72 and 74 of the spring 22 are arranged to interact respectively with the driver discs 28 of the driven member 26. The upper driver disc 28 operates to engage and interact with the upper end 72 of the spring 22 and the lower driver disc 28 interacts with the lower end 74 of the spring 22. In order to enable engagement with the respective ends of the spring 22, the driver discs 28 are formed with a generally dovetailed driver member 78 which, as seen in FIG. 2, extends to the inner circumferential surface 76 of the insert sleeve 24. Thus, the uppermost dovetail member 78 will engage with the upper end 72 of the spring 22 and the lower dovetail member 78 will engage with the lower end 74. It will be noted that even at high torques, the ends 72 and 74 will not be bent by the corresponding dovetail members 78 since the members 78 with their outer corners will transmit a corresponding torque directly to the helical spring segment which extends in the circumferential direction and which adjoins the respective bent end 72, 74. That is, in the operation of the device, the spring 22 will be rotated by rotation of the worm wheel 16, in a manner to be more fully described hereinafter. When an end 72, 74 of the spring 22 engages a dovetail member 78, it will tend to cause rotation of the driven member 26 whereupon a reaction force will develop in the spring 22 which is directed circumferentially of the spring 22 and which will not necessarily cause bending of the ends 72, 74.

It is also advantageous that the dovetail drive members 78 prevent axial drift or migration upwardly or downwardly on the part of the coils of the helical spring 22 which lie between the ends 72, 74. As best seen in FIG. 1, the discs 28 are located on the upper part of the driven member 26 and are axially spaced apart by a collar 80 which is mounted on the driven shaft 68 and which is formed with an enlarged diameter so that it may be pressed onto or slidably engaged with the driven shaft 68 and then soldered or welded in position. Of course, other types of connections are also possible and the driver discs may also be constructed integrally with the driven shaft.

The pinion 30 is press fitted with frictional engagement onto a segment 82 at the bottom end of the driven shaft 68, the segment 82 having a grooved or corrugated configuration with a reduced diameter.

The disengaging auxiliary driving element 32 is composed of a circular disc portion 84 which extends perpendicularly to the common rotational axis 42 and which has an axial bearing pin 86 projecting upwardly therefrom. The pin 86 is formed with a central interior polygonal surface 88 which is adapted for reception of a correspondingly shaped actuating key or auxiliary power source (not shown). The bearing pin 86 is rotatably supported in a corresponding bearing aperture 90 of the housing cover 36. A partial cylindrical member 92, whose sectional configuration is best seen in FIG. 2, extends downwardly from the circular disc 84 and is arranged to be generally concentric with the rotational axis 42. As will be seen from FIG. 1, the partial cylindrical member 92 will extend in the axial direction almost to the bearing disc 44 of the driving member 16. The sectional configuration of the member 92 as seen in FIG. 2 corresponds to a circular annular member having a sector thereof cut out. The partial cylindrical member 92 is formed with edges 94 which extend in the axial as well as in the radial direction. As seen in FIG. 2, the edges 94 are arranged to interact with the corresponding ends 72 and 74 of the helical spring 22 in accordance with the direction of rotation of the disengaging auxiliary driving member 32, as will be explained more fully hereinafter.

In addition, the member 32 is formed with a collar 96 at the upper axial end of the partial cylindrical member 92, the collar 96 projecting radially inwardly and resting against the outer circumference of the driver disc 28. This will operate to provide an additional support by the element 32 on the driven member 26 during rotation thereof.

In the operation of the transmission drive mechanism of the invention, when the unit is operating under normal conditions, the output or threaded cable 14 will be driven by the worm 12, with the worm 12 providing the basic input power for the unit. Thus, under these conditions, for example a window lifting mechanism will be actuated by means of an electrical drive motor (not shown) through the worm 12 which is connected with the drive motor. Thus, the frictional engagement of the elements of the transmission mechanism of the invention, as described above, will operate to transmit the input driving power to the threaded cable 14. As will be noted, actuation of the worm 12 will cause rotation of the driving member 16 which will, in turn, drive therewith the hollow cylindrical element 18. The hollow cylindrical element 18 will drive the helical spring 22 as a result of the frictional engagement thereof with the sleeve insert 24 and as a result, depending upon the direction of rotation of the driving member 16, one of the ends 72, 74 of the spring 22 will be brought into engagement with one of the sides of a dovetail drive member 78. As a result, the rotational torque of the spring 22 will drive the driven member 26 which will thereby be rotatively coupled in the unit. It will be apparent that the member 26 will be rotatively driven independently of the direction of rotation of the driving member 16. Specifically, when the drive motor is actuated, the hollow cylindrical element 18 will be rotated, for example in a clockwise direction as indicated by arrow A in FIG. 2 through the worm 12, the driving member 16 and the rubber cushioning member 20. Thus, the end 72 of the spring 22 will, after a short amount of rotation, be brought into contact with the dovetail drive member 78 which is, until this time, at a standstill. Upon further rotation in the direction A of the hollow cylindrical element 18, a force corresponding to the operative torque will be applied by the dovetail member 78 upon the helical spring 22 which will be exerted in the longitudinal direction of the spring. This force will tend to expand the spring 22 and as a result of this expansion, the spring 22 will be pressed with an increasing frictional force against the inner circumferential surface 76 of the sleeve insert 24. As a result, there will occur secure frictional engagement between the helical spring 22 and the insert sleeve 24 with this frictional force being increased as the applied torque is increased.

It will be seen further that when the hollow cylindrical element 18 is rotated in a direction opposite to the direction A, the driven element 26 will be correspondingly driven in an opposite direction as a result of the fact that the lower end 74 of the helical spring 22 will interact with the lower dovetail drive member 78. In either case, the disengaging auxiliary driving element 32 will be merely freely rotated without interfering with the transmission or operation of the mechanism.

Should a defect occur in the electric drive motor which drives the worm 12, the mechanism may nevertheless be operated to transmit power to the output threaded cable 14 from an auxiliary power source through the disengaging auxiliary drive element 32. As previously indicated, this auxiliary driving power may be manually applied merely by inserting an auxiliary actuating key into the polygonal recess 88, the key being possibly a tool which is available with the vehicle tool kit to enable manual operation of the window mechanism. Rotation of such a key, for example in a direction B shown in FIG. 2, will cause rotation of the partial cylindrical member 92 which will also rotate in accordance with the indicated direction. After a short amount of rotation, an edge 94 of the element 92 will come into contact against the upper end 72 of the helical spring 22. Upon further rotation in the direction B of the member 32, the edge 94 will pull the upper end 72 of the helical spring 22. Since the direction of force applied to the end 72 is such as to tend to contract the diameter of the spring, this action will result in a lifting or separation of the spring 22 from the inner circumferential surface 76 of the insert 24. Consequently, the frictional force between the spring 22 and the hollow cylindrical element 18 is decreased sufficiently to result in disconnection of the engagement between the spring 22 and the element 18.

With further rotation of the disengaging element 32, the upper end 72 will be carried along with the edge 94 and will eventually come into contact with the dovetail drive member 78 as the spring is compressed and disconnected from the surface 76. At this point, further rotational movement of the element 32 will be transmitted to the driven member 26 through the dovetail drive member 78. Consequently, the driven member 26 will be coupled for rotation with the disengaging auxiliary driving element 32.

At the same time, the rotational coupling between the driven member 26 and the driving member 16 will be disconnected inasmuch as the helical spring 22 is no longer in frictional engagement with the hollow cylindrical element 18. Transmission of a driving force to actuate the threaded cable 14 in order to operate the window actuating mechanism is therefore no longer prevented as a result of a possibly inoperative electrical drive motor and an auxiliary driving source may be applied through the element 32 in order to drive the output element 14.

Of course, as previously indicated, this auxiliary driving force may or may not be manually applied.

Because of the symmetry of the mechanism, actuation thereof may, of course, be readily effected in a rotational direction opposite to that previously described, in which case the partial cylindrical member 92 will engage the lower end 74 of the helical spring 22 instead of the upper end 72. As seen in FIG. 2, the opposite edge 94 will press against the dovetail drive member 78 of the lower disc 28 and the driven member 26 will be rotated in an opposite direction. In either case, the window may be readily driven with the aid of a manual tool since such a tool will act directly upon the driven member 26 and the pinion 30 through the auxiliary driving member 32 and there will not be required a large transmission ration therebetween.

Of course, after the defect in the primary driving power source has been corrected and, for example, the electrical drive motor has been repaired or replaced, the auxiliary driving element 32 need no longer be utilized and the apparatus may be again returned to normal operation merely by removal of a manual tool from the polygonal recess 88, in a case where the auxiliary drive is accomplished by manual means. Because of the coaxial orientation of the parts, the entire mechanism may be quite compact because the disengaging auxiliary drive member 32 is supported coaxially relative to the other members and substantial advantages may be derived from such a structure.

Unlike the present invention, in other auxiliary actuating devices, such as that known from German Offenlegungsschrift No. 27 05 627, the drive connection between the electromotor and the drive apparatus must itself be detached and after elimination of a defect, it must be again reconstructed, for example, by disengaging a drive shaft from a take along position in which the drive shaft is connected rigidly for rotation with a coaxial connecting shaft. In such a known auxiliary actuated device, there is also required greater constructional space since the structural components, unlike those of the present invention, are not disposed coaxially with each other, but on two differing parallel axes situated alongside each other and spaced apart.

With the present invention, the disengaging auxiliary drive element 32 may also be connected with an auxiliary drive apparatus by means of a socket connection or plug-in connecton. Such a coupling would make it easy to actuate the auxiliary drive and would require little structural space particularly when the disengaging element 32 is furnished with an interior polygonal recess for a manual actuating member.

It will be apparent that the present invention also gives rise to further advantages in that due to the construction of the unit which is composed of the driving member 16, the hollow cylindrical element 18, and the rubber cushioning member 20 there is prevented transmission of vibrations and/or shock, for example impact shock, between the driving member 16 and the driven member 26 thereby reducing noise and mechanical wear. It will be apparent that with the driving element 16 structured with the axially projecting webs 56, and with the rubber cushioning member 20 being formed with the segments 60 located between the webs 54 and 56 of the members 18 and 16 respectively, there occurs in the circumferential direction a resilient characteristic which enables good shock absorption.

It will be further noted that an especially compact arrangement is obtained in the axial direction by constructing the driving element or the hollow cylindrical element with the bearing collar 50 so that the rotation of the hollow cylindrical element 18 may be better supported.

By furnishing the hollow cylindrical element 18 with the metallic insert sleeve 24, there is achieved operation which will be subject to less wear and which will perform with a consistently high frictional coefficient between the helical spring 22 and the driving member 16. The hollow cylindrical element 18 can itself be economically produced from less wear-resistant material, for example, plastic as a result of the utilization of the metallic sleeve insert 24.

Furthermore, it will be seen that as a result of the construction of the discs 28 of the driven member 26 there is achieved a very reliable contact between the bent ends of the helical spring and the dovetail drive member 78 which essentially operate as claw members. Furthermore, secure guidance of the helical spring coils between the two drive members 78 is achieved as a result of the fact that the drive members project radially outwardly over the interior diameter of the helical spring. Thus, one of the dovetail drive members 78 may be considered as a first claw member which is constructed in the region of each of the two ends of the helical spring as a level drive member which is mounted on the driven shaft, which extends perpendicularly to the rotational axis of the moving members, which projects radially over the inside diameter of the helical spring and which has preferably an approximately dovetail configuration.

In order to reduce production costs, the two dovetail drive members 78 may be constructed to be coextensive with and/or as a unitary part of the driven shaft.

Because of its compact and relatively sturdy construction, the present invention provides the capacity for a constantly effective auxiliary actuation and is especially suitable as drive apparatus for a window actuating mechanism in a motor vehicle. As a result of the structural advantages of the invention, the driven member may have rigidly connected therewith the pinion 30 which meshes with the threaded cable 14 of the cable-type window lifting mechanism. Of course, it may also be arranged to be meshed with a toothed segment of a rod-type linkage window lifting mechanism. In any event, the driven member may alternatively also be connected to be rotatively fixed with a cable drum for the rope of a rope-drawn type of window lifting mechanism.

In an embodiment of the invention which is mechanically stable and yet quite simple to produce, the disengaging auxiliary drive member 32 is constructed with the partial cylindrical member 92 which forms a second claw member of the drive mechanism and which is disposed between the helical spring and the driven shaft which penetrates the helical spring. The edges of the partial hollow cylindrical member extend in the axial direction and interact with the radially inwardly bent ends 72, 74 of the helical spring 22.

A simple support for the disengaging auxiliary driving member 32 and one which requires little structural space in the axial direction is provided by the fact that the member 32 is rotatably supported in a bearing opening of the drive housing having the axial bearing pin 86. As will be noted from the previous description, the sturdiness and operational reliability of the unit is increased as a result of the fact that the element 32, which in normal operation rotates freely, is additionally supported on the first claw member by means of the collar 80 which rests on one of the drive discs 28.

While a specific embodiment of the invention has been shown and described in detail to illustrate the application of the inventive principles, it will be understood that the invention may be embodied otherwise without departing from such principles.

What is claimed is:

1. Drive transmission apparatus especially suitable for use in motor vehicles comprising: a rotatably supported driving member; a rotatably supported driven member coaxial with said driving member; a hollow cylindrical element defining an inner circumferential surface arranged coaxially with said driving and driven members; a helical spring braced against said inner circumferential surface within said hollow cylindrical element; a first claw member affixed on one of said driving and driven members for rotation therewith; said first claw member operating to engage with said helical spring to effect expansion of said spring when said first claw member is rotated relative to said spring; said hollow cylindrical element being rigidly connected for rotation with the other of said driving and driven members; a disengaging element adapted to be connected with an auxiliary drive apparatus rotatably supported coaxially with said driving and driven members and having a second claw member formed thereon; said second claw member being operative upon corresponding mutual rotation between said helical spring and said disengaging element to engage said helical spring to effect reduction of the diameter thereof; said helical spring comprising a pair of radially extending ends with said first claw member engaging one of said ends depending upon the relative direction of rotation between said helical spring and said first claw member in order to effect expansion of said helical spring; said second claw member engaging against the other of said ends of said helical spring depending upon the direction of relative rotation between said second claw member and said helical spring in order to operate to reduce the diameter of said helical spring; said disengaging element being constructed with a partial cylindrical member extending therefrom which forms said second claw member and which is radially disposed between said helical spring and said driven member; said partial cylindrical member extending into said helical spring and having edges thereon which extend in an axial direction and which interact with said ends of said helical spring.

2. Apparatus according to claim 1 wherein said disengaging element is adapted to be connected with an auxiliary drive apparatus by means of a socket connection.

3. Apparatus according to claim 2 wherein said disengaging element is formed with a polygonal recess adapted for having engaged therein a manual actuating member.

4. Apparatus according to claim 1 wherein said driving member and said hollow cylindrical element are each formed with webs which extend axially and which are circumferentially distributed, with the webs on said driving member being angular spaced from the webs on said hollow cylindrical element in order to define therebetween an intermediate space in the circumferential direction between said webs, said apparatus further comprising a spring element extending to within said intermediate space and engaged between said driving member and said hollow cylindrical element.

5. Appartus according to claim 1 wherein said hollow cylindrical element is rotatably affixed with said driving member to form a single rotative unit, said apparatus further comprising a bearing collar formed on said rotative unit which serves to support said unit for rotation within said apparatus.

6. Apparatus according to claim 1 wherein said inner circumferential surface is formed by a metallic sleeve insert which is provided as part of said hollow cylindrical element.

7. Apparatus according to claim 1, wherein said first claw member is constructed in the region of each of said ends of said helical spring as a drive part which is mounted on said driven member and which extends perpendicularly to the rotational axis of said driving and driven members and which projects radially over the interior diameter of said helical spring.

8. Apparatus according to claim 7 wherein said first claw member is formed with a dovetail shape.

9. Apparatus according to claim 7, wherein each of said drive parts is constructed to be coextensive with each other.

10. Apparatus according to claim 7, 8, or 9, wherein said drive parts are constructed in one piece with said driven member.

11. Apparatus according to claim 1 wherein said driven member has rotatively connected therewith a pinion which meshes with a threaded cable of a cable-type window lift mechanism of an automotive vehicle.

12. Apparatus according to claim 1 including housing means defining a bearing aperture, said disengaging element being rotatably supported in said bearing aperture and being formed to include a part thereof generally shaped as a bearing pin engaging in said bearing aperture, said bearing pin part being constructed with a polygonal recess for engagement therein of an auxiliary drive mechanism.

13. Apparatus according to claim 1, wherein said disengaging element is supported on said first claw member by means of a collar which rests on the circumference of a driver disc which is mounted on said driven member.

14. Apparatus according to claim 1, wherein said hollow cylindrical element is rotatably fixed relative to said driving member and wherein said first claw member is affixed with said driven member.

* * * * *

UNITED STATES PATENT AND TRADEMARK OFFICE
CERTIFICATE OF CORRECTION

PATENT NO. : 4,499,787
DATED : February 19, 1985
INVENTOR(S) : Rolf Leistner et al It is certified that error appears in the above-identified patent and that said Letters Patent is hereby corrected as shown below:

In the heading of the Patent it should read:

[73] Assignee: Brose Fahrzeugteile GmbH und Co. Kommanditgesellschaft and Bayerische Motoren Werke Aktiengesellschaft

Signed and Sealed this

*Twenty-second* Day of *October 1985*

[SEAL]

*Attest:*

DONALD J. QUIGG

*Attesting Officer*

*Commissioner of Patents and Trademarks—Designate*